(12) United States Patent
Daoud

(10) Patent No.: US 6,311,007 B1
(45) Date of Patent: Oct. 30, 2001

(54) FIBER-OPTIC CABLE TRAY HAVING ADJUSTABLE COMPONENTS

(75) Inventor: Bassel Hage Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/390,204

(22) Filed: Sep. 7, 1999

(51) Int. Cl.[7] .................................................. G02B 6/00
(52) U.S. Cl. ........................................ 385/135; 385/137
(58) Field of Search ................................... 385/134, 135, 385/136, 137

(56) References Cited

U.S. PATENT DOCUMENTS

| 4,687,289 | * | 8/1987 | DeSanti ................................ 385/135 |
| 5,066,149 | * | 11/1991 | Wheeler et al. ....................... 385/135 |
| 5,278,933 | * | 1/1994 | Hunsinger et al. .................... 385/135 |
| 5,323,480 | * | 6/1994 | Mullaney et al. ..................... 385/135 |
| 5,572,617 | * | 11/1996 | Bernhardt et al. .................... 385/135 |
| 6,091,876 | * | 7/2000 | Hizuka et al. ........................ 385/135 |

* cited by examiner

Primary Examiner—Cassandra Spyrou
Assistant Examiner—Euncha Cherry
(74) Attorney, Agent, or Firm—Stroock & Stroock & Lavan LLP

(57) ABSTRACT

A fiber-optic cable tray having adjustable components that provide flexibility in accommodating changes in length of the routed fiber-optic cable and that ensures a minimum bend radius for the routed cable.

18 Claims, 4 Drawing Sheets

FIBER-OPTIC CABLE TRAY HAVING ADJUSTABLE COMPONENTS

FIELD OF THE INVENTION

The present invention relates to fiber-optic cable routers and guides and, more particularly, to a fiber-optic cable tray including adjustable cable routing and storage components.

BACKGROUND OF THE INVENTION

It is often necessary to splice already-installed fiber-optic cables to provide for connection to a different end-point. Such fiber-to-fiber splices require removal of a section of the fiber cable so that the spliced end(s) may be properly prepared. This, in turn, changes the length (i.e., shortens) of the cable. Since fiber-optic cables are typically installed with a certain amount of slack in the cable, splicing changes the amount of slack that must be accommodated by the cable routing components. Following a splice, it thus becomes necessary to accommodate a different length of fiber cable. In addition, a minimum radius must be provided to prevent damage to the fiber-optic cable. It is thus desirable to provide a fiber-optic cable tray having selectively adjustable components that can accommodate changes in fiber-optic cable length, route fiberoptic cable, hold splices, and ensure the fiber-optic cable is not bent beyond a predetermined bend radius.

SUMMARY OF THE INVENTION

The present invention is directed to a fiber-optic cable tray having adjustable components that provide flexibility in accommodating changes in length of the routed fiber-optic cable and that ensures a minimum bend radius for the routed cable.

The present invention is directed to a fiber-optic cable storage and routing tray having a base having a track defined longitudinally therein. The storage and routing tray also includes a first cable storage and routing component for routing a fiber-optic cable along a first part of a fiber-optic cable routing path. The first component is disposed in the track for selective movement on and along the tray.

The tray further may also include a second cable storage and routing component for routing the fiber-optic cable along a second part of the cable routing path. The second component is disposed in the track for selective movement on and along the tray. The selective movement of the first and second components changes the cable routing path, and one of the first and second components defines a generally arcuate part of the fiber-optic cable routing path. The first component preferably comprises a cable router, and the second component preferably comprises a splice holder.

The present invention is also directed to a fiber-optic cable storage and routing tray comprising a base and having a track defined longitudinally in the base and providing a path along which a component may be selectively moved.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a fiber-optic cable tray having adjustable components that provide flexibility in accommodating changes in length of the routed fiber-optic cable and that ensures a minimum bend radius for the routed cable.

Figure 1:
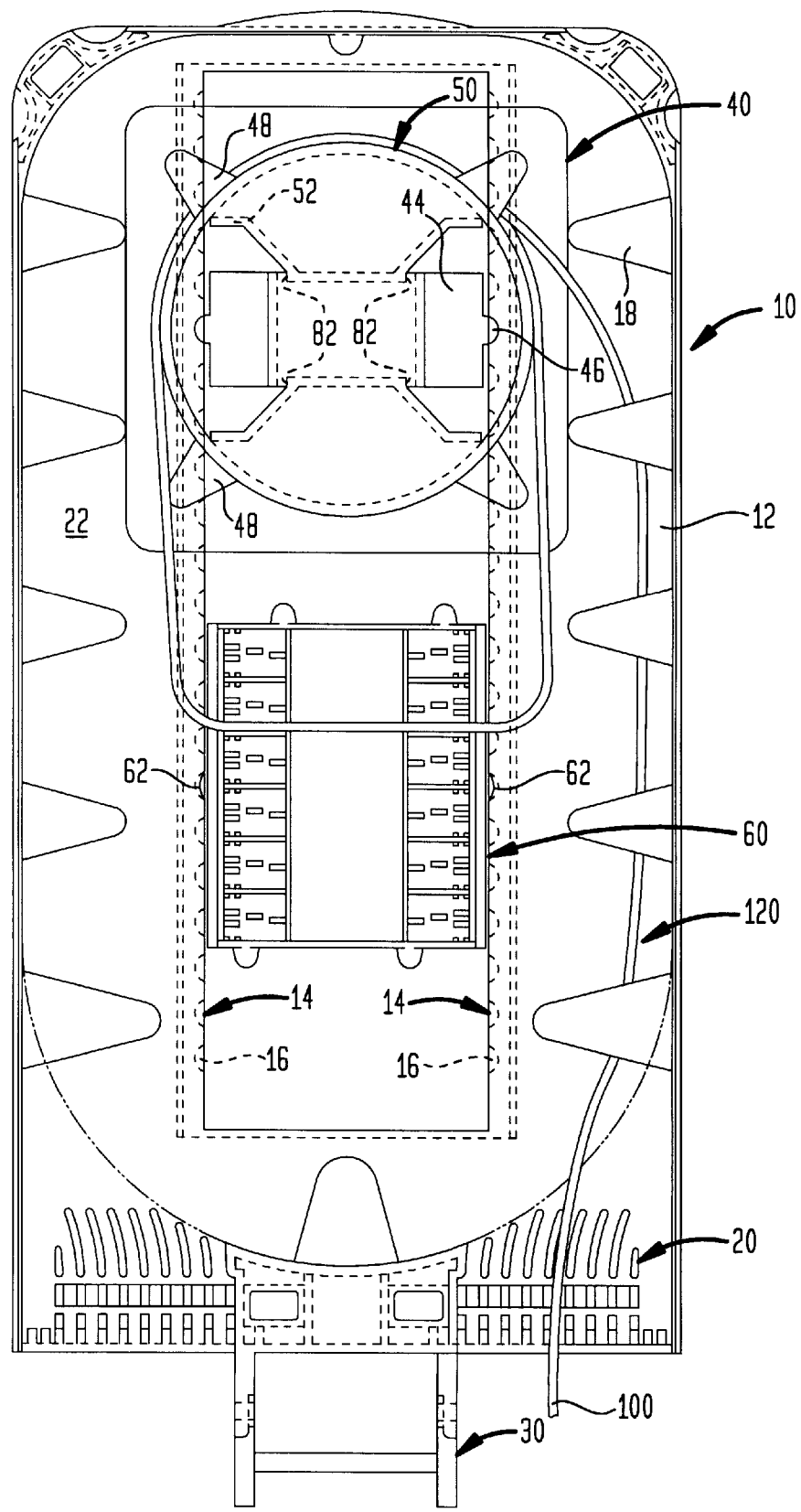
FIG. 1 is a top view of a fiber-optic cable tray having adjustable components and constructed in accordance with the present invention.

Referring now to the drawings in detail, FIG. 1 depicts an embodiment of a fiber-optic cable tray 10 constructed in accordance with the present invention. The tray 10 has a track 14 longitudinally defined therein that includes a plurality of detents 16 sized and shaped for accepting a complementarily sized tab and for releasably securing a component in position on the tray 10, as discussed in detail below. The track 14 is preferably disposed on or near a bottom surface. A plurality of fiber-optic cables 100 may be routed on and along the top surface 22 of the tray 10 over a plurality of cable routing paths 120. Each of the plurality of cable routing paths 120 may be defined, at least in part, by the relative location of the various components provided on the tray 10. A plurality of guides 18 are provided peripherally about the tray 10 to secure the cables 100 on the surface 22 and along the cable routing paths 120.

A plurality of strain reliefs 20 are provided at an approximate ingress location for fiberoptic cables 100 onto the tray 10. The tray also includes a pivotable mount 30 for hingedly connecting the tray 10 in a fiber-optic enclosure (not shown).

As used herein, the term fiber-optic storage and routing component includes, but is not limited to, any device, component, structure, etc., for routing fiber-optic cables, providing bend-limiting for fiber-optic cables, securing fiber-optic cable splices, and securing fiber-optic cables. It is to be understood that a routing and storage component, in accordance with the present invention, includes the devices, components, structures, etc., expressly disclosed herein, and other art-recognized fiber-optic cable management, routing, and storage devices, components, and structures.

A single or a plurality of fiber-optic cable storage and routing components may be provided on the tray 10 of the present invention. These components include, by way of non-limiting example, a cable router, a cable splice holder, and various other devices, components, and structures which may store and route one or a plurality of fiber-optic cables. The tray 10 may be equipped with any combination of selectively movable mounted storage and routing components, in accordance with the present invention. In addition, the tray 10 may include storage and routing components fixedly mounted thereto.

Figure 2:
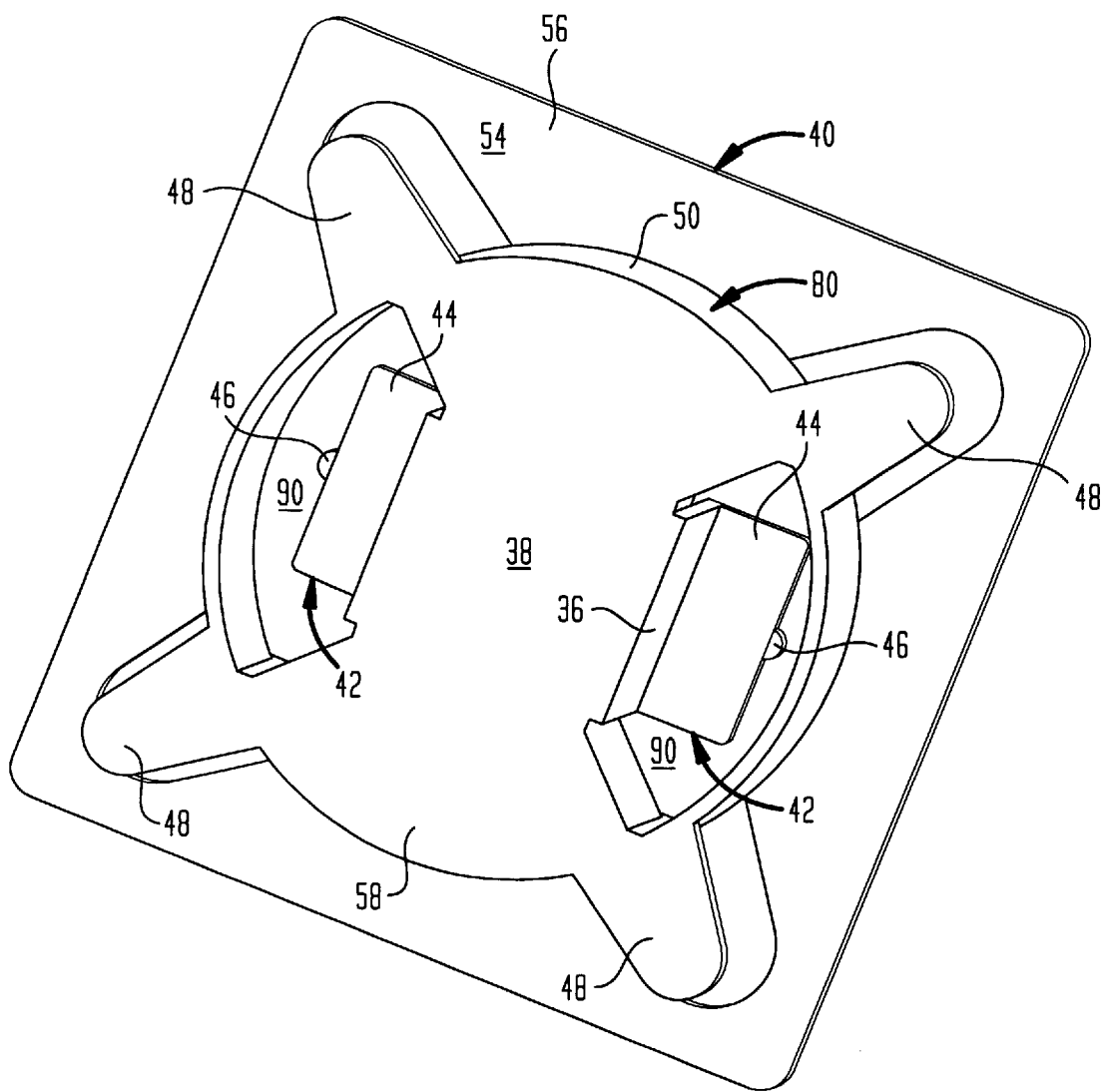
FIG. 2 is a perspective top-view of a first embodiment of a cable router adapted for use in the tray of FIG. 1 and constructed in accordance with the present invention.

Referring next to FIG. 2, a first embodiment of a router 40 which may be provided as one of the storage and routing components on the tray 10 and constructed in accordance with the present invention is there depicted. The router 40 has a generally square base 56 and a platform 58 defined by a top surface 38 and a generally circular routing surface 50 extending generally upward from the base 56 and which also defines a generally arcuate part 80 of a fiber-optic cable routing path 120. The base 56 has a top surface 54 that defines a first plane from which the routing surface 50 originates. The platform top surface 38 defines a second plane that is vertically spaced apart from the plane of the base top surface 54 and generally parallel therewith and at which the routing surface 50 terminates. Cable guides 48 extend outward from the routing surface 50 and are substantially co-planar with the platform top surface 38. Four guides 48 are depicted in FIG. 2, although more or less guides 48 may be provided in accordance with the present invention. The shape of the guides 48 is also a routine matter of design choice, as long as that the guides 48 prevent movement of a fiber-optic cable 100 off of the routing surface 50, i.e., off of the arcuate part 80 of the cable routing path 120. The guides 48 and base top surface 54 also serve to define the arcuate part 80 of the cable routing path 120 by defining lateral boundaries thereof.

The router 40 includes two mounts 42 located opposite each other to secure the router 40 in the track 14 of the tray 10. The mounts 42 each include a base 44 which extends generally perpendicularly outward from a wall 36 extending generally downward from the platform top surface 38. A tab 46 extends outward from each base 44 and is sized and shaped to releasably engage a detent 16 defined in the track 14. The mounts 42 are each individually deflectable by applying pressure to the wall 36 in a direction generally transverse thereto and deflecting the mounts 42 generally toward each other. Access to the mounts 42 is via openings 90 defined through the platform top surface 38, as described in more detail below. Two stops 82 are provided (see, e.g., FIG. 1) for each mount 42 to limit the deflection thereof and to prevent damage to the mounts 42 due to excessive deflection during insertion, removal, and movement of the router 40 in a fiber tray 10.

When the router 40 is installed in a fiber tray 10, it is secured therein against pivotal movement by a plurality of stabilizers 52 that contactingly engage the fiber tray 10 and that are located on a bottom side of the router 40 (see, e.g., FIG. 1).

Figure 3:
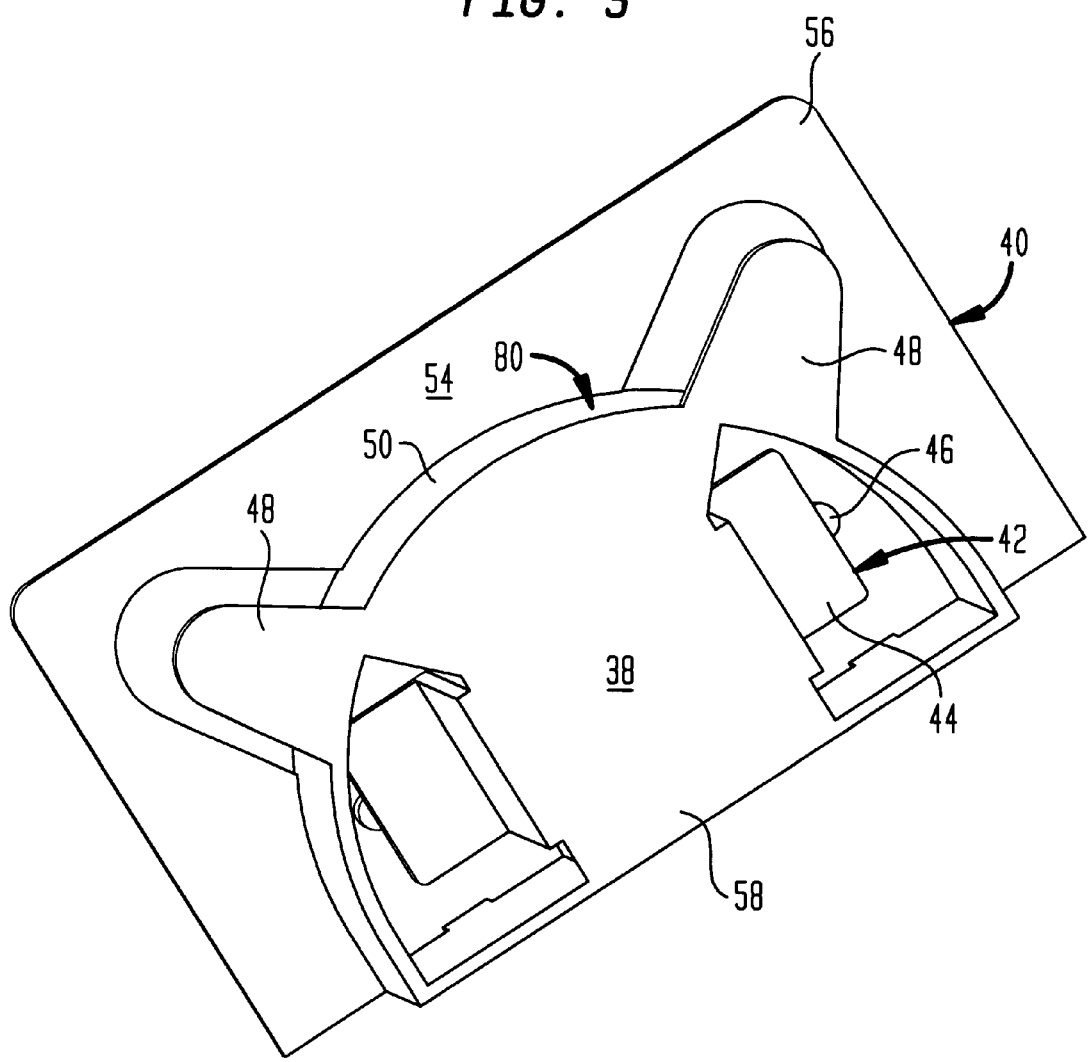
FIG. 3 is a perspective top-view of a second embodiment of a cable router adapted for use in the tray of FIG. 1 and constructed in accordance with the present invention.

Another embodiment of a router 40 constructed in accordance with the present invention is depicted in FIG. 3. In this embodiment, the routing surface 50 is generally semicircular and also defines a generally arcuate part 80 of the cable routing path 120. The router 40 of this embodiment also includes two mounts 42 constructed and operable as described above.

Figure 4:
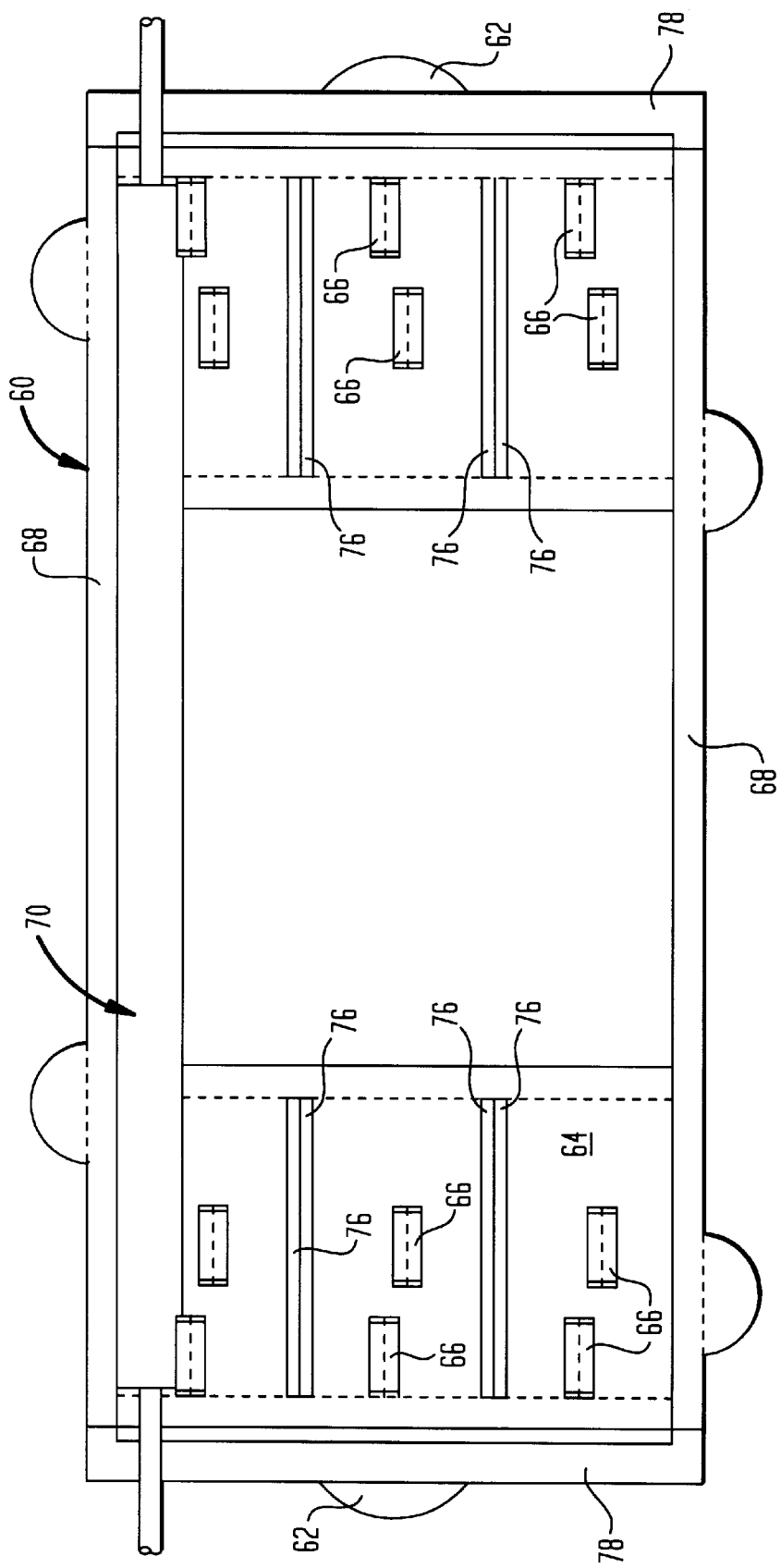
FIG. 4 is a top view of a splice holder adapted for use in the tray of FIG. 1 and constructed in accordance with the present invention.

Referring next to FIG. 4, an embodiment of a splice holder 60 which may be provided as one of the storage and routing components provided on the tray 10 and constructed in accordance with the present invention is there depicted. The splice holder 60 comprises a generally rectangular structure adapted to securely grip a plurality of fiber-optic cable splices 70. A plurality of deflectable arms 66 extend generally upward from an upper surface 64 of the holder 60 for individually holding a plurality of fiber-optic cable splices 70. The arms 66 provide a deflectable latching element of the holder 60 for engaging and latching onto a splice 70. The resiliency of the arms 66 biases the arms 66 generally toward a longitudinal sidewall 68 of the holder, or toward an obstruction wall 76 that extends generally upward from the upper surface 64 of the holder 60, depending upon the location of the arm 66.

A tab 62 is provided at each end of the splice holder 60 and is sized and shaped to fit within a detent 16 defined in the track 14 of the tray 10. Endwalls 78 of the holder 60 are generally deflectable to permit engagement of the tab 62 in the detent 16 and to further permit movement of the splice holder 60 on and along the track 14, as described in more detail below.

In use, a splice 70 is mounted onto the splice holder 60 by pressing the splice 70 downwardly between an arm 66 and sidewall 68 or obstruction wall 76, depending upon the placement location of the splice 70. The resilience of the arms 66 urges the arms to return to their natural, undeflected states, being generally biased toward the sidewall 68 or obstruction wall 76.

Referring again to FIG. 1, operation of the fiber-optic cable storage and routing tray 10 of the present invention will now be discussed in detail. A fiber-optic cable 100 may be routed onto the tray 10 through a strain relief 20 provided at an ingress location of the tray 10. The cable 100 is routed on and along the tray over a cable routing path 120, a plurality of which may be defined on and along the tray 10. The cable 100 is routed about the router 40 on and along the routing surface 50, which defines a generally arcuate part 80 of the routing path 120. The router 40 may be selectively positioned on the tray 10 by operation of the selectively moveable mounts 42 and by selective movement of the router 40 in and along the track 14. The single router 40 depicted in FIG. 1 is merely an illustrative, non-limiting embodiment of the present invention. Also contemplated by the present invention are multiple routers 40 on a single tray 10, and routers 40 of various configurations such as, for example, the router embodiments depicted in FIGS. 2 and 3. It will be obvious to persons skilled in the art that numerous other router configurations may be provided on the tray 10 without departing from the spirit or intent of the present invention.

The fiber-optic cable 100 may also be routed through a splice holder 60, that is selectively movably provided on the tray 10. As it is often necessary to splice already or newly installed fiber-optic cables 100, the splice holder 60 securely holds the splice in place on the tray 10 and further defines a part of the routing path 120 over which one or a plurality of fiber-optic cables may be routed.

The length and shape of a particular routing path 120 is defined, in part, by the relative positions of the router 40 and splice holder 60. Thus, for an already-installed cable requiring a splice, for example, the routing path 120 for that cable may be shortened as a result of the splice. A new routing path may be defined to accommodate the shorter cable by selectively moving one or both of the router 40 and splice holder 60. Thus, a routing path 120 may be generally oblong, rectangular, circular, and various other shapes, and may have a variable length. The tray 10 of the present invention thus provides the flexibility to accommodate changes in fiber-optic cable length (i.e., resulting in changes in the routing path length) that inevitably occur during installation and use of fiber-optic cables.

Movement of the router 40 is accomplished by deflecting mounts 42 in a direction generally toward each other (i.e., in a direction generally transverse to the wall 36) by application of a squeezing-type pressure applied to the walls 36 such as, for example, by a thumb and fore-finger; with access to the mounts 42 being through the openings 90. When so deflected, the mounts 42 disengage from the detents 16 and the router 40 may be moved longitudinally on the tray 10 (in and along the track 14). The router 40 may thus be selectively positioned on the tray 10, and may be moved, as needed, on and along the tray 10.

Movement of the splice holder 60 is similarly accomplished by selective deflection of the endwalls 78, which causes the tabs 62 to disengage from the detents 16, thereby permitting movement of the holder 60 on the tray (in and along the track 14).

It is also contemplated that a plurality of routers 40 may be provided on a single tray 10. In that case, each router 40 is individually movable on and along the tray 10 to define parts of a plurality of cable routing paths 120.

The generally arcuate part 80 of the routing path 120 defined by the routing surface 50 in each of the various embodiments of the router 40 described herein limits bending of the fiber-optic cable 100 to prevent damage thereto. Preferably, the routing surface 50 provides a bend radius of at least approximately 1½ inch to the fiber-optic cable 100 as it passes thereover. It will be obvious to persons skilled in the art that the routing surface 50 may provide for a greater or lesser bend radius, depending on the specific type of fiber-optic cable. Thus, the limitation on the bend radius disclosed herein is an illustrative, non-limiting, preferred embodiment of the present invention.

It will be obvious to persons skilled in the art that the routers 40 of the present invention may be provided on a fiber tray 10 in virtually any combination (i.e. of circular and semi-circular) to provide for routing paths having a variety of shapes and configurations. The embodiments and examples described herein are provided as illustrative, non-limiting examples of the present invention and are not intended to limit the scope or spirit of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable storage and routing device comprising:
   a tray having a surface and having track defined longitudinally therein;
   a first cable storage and routing component for routing a fiber-optic cable along a first part of a fiber-optic cable routing path, said first component being disposed in said track for selective movement on and along said surface of said tray, said first component having a selectively deflectable mount for movably securing said first component in said track in one of a plurality of positions on said tray; and
   a second cable storage and routing component for routing the fiber-optic cable along a second part of the cable routing path, said second component being disposed in said track for said selective movement on and along said tray, selective movement of said first and said second components changing said cable routing path.

2. A fiber-optic cable storage and routing device as recited by claim 1, wherein said selective movement of said first and said second components changes the length of said cable routing path.

3. A fiber-optic cable storage and routing device as recited by claim 1, wherein said selective movement of said first and said second components changes the shape of said cable routing path.

4. A fiber-optic cable storage and routing device as recited by claim 1, wherein said second cable storage and routing component comprises a splice holder for accommodating a fiber-optic splice.

5. A fiber-optic cable storage and routing device as recited by claim 4, wherein said splice holder further comprises a selectively deflectable mount for movably securing said splice holder in said track.

6. A fiber-optic cable storage and routing device as recited by claim 5, wherein said selectively deflectable mount further comprises a movement limiting feature and wherein said track has a feature defined therein that is complimentarily sized and shaped with said movement limiting feature and wherein releasable engagement of said movement limiting feature and said track feature prevents movement of said splice holder on and along said tray.

7. A fiber-optic cable storage and routing device as recited by claim 6, wherein said movement limiting feature comprises a tab extending from said mount and wherein said track feature comprises a detent defined in said track and within which said tab is releasably seatable.

8. A fiber-optic cable storage and routing device as recited by claim 1, wherein said first cable storage and routing component comprises a cable router having a routing surface that defines a generally arcuate part of said cable routing path, said generally arcuate part of said cable routing path being sized and shaped as to inhibit bending of the fiber-optic cable beyond a predetermined amount.

9. A fiber-optic cable storage and routing device as recited by claim 8, wherein said router further comprises a plurality of guides disposed along said cable routing path for preventing movement of the fiber-optic cable off of said generally arcuate part of said cable routing path.

10. A fiber-optic cable storage and routing device as recited by claim 9, wherein each of said plurality of guides comprises a tab that extends generally perpendicularly from said routing surface.

11. A fiber-optic cable storage and routing device as recited by claim 8, wherein said generally arcuate part of said cable routing path is generally circular.

12. A fiber-optic cable storage and routing device as recited by claim 8, wherein said generally arcuate part of said cable routing path is generally semicircular.

13. A fiber-optic cable storage and routing device as recited by claim 8, further comprising a stabilizer for limiting rotational movement of said cable router with respect to said tray.

14. A fiber-optic cable storage and routing device as recited by claim 1, wherein said selectively deflectable mount further comprises a movement limiting feature and wherein said track includes a feature defined therein that is complimentarily sized and shaped with said movement limiting feature and wherein releasable engagement of said movement limiting feature and said track feature prevents movement of said cable router on and along said tray.

15. A fiber-optic cable storage and routing device as recited by claim 14, wherein said movement limiting feature comprises a tab extending from said mount and wherein said track feature comprises a detent defined in said track and within which said tab is releasably seatable.

16. A fiber-optic cable storage and routing device comprising:
   a tray having a surface;
   a track defined longitudinally in said tray and providing a path along which a component is selectively moved on and along said surface and within which said component is retained;
   a first cable storage and routing component for routing a fiber-optic cable along a first part of a cable routing path defined on said tray, said first component being disposed in said track for selective movement on and along said surface of said tray; and
   a second cable storage and routing component for routing the fiber-optic cable along a second part of said cable routing path, said second component being disposed in said track for selective movement on and along said surface of said tray.

17. A fiber-optic cable storage and routing device as recited by claim 16, wherein said first cable storage and routing component comprises a cable router having a routing surface that defines a generally arcuate part of said cable routing path, said generally arcuate part of said cable routing path being sized and shaped as to inhibit bending of the fiber-optic cable beyond a predetermined amount.

18. A fiber-optic cable storage and routing device as recited by claim 16, wherein said second cable storage and routing component comprises a splice holder for accommodating a fiber-optic splice.

\* \* \* \* \*